United States Patent
Dykstra

(10) Patent No.: US 12,292,079 B2
(45) Date of Patent: May 6, 2025

(54) ADJUSTABLE STRETCH CORD CONNECTOR

(71) Applicant: HAMPTON PRODUCTS INTERNATIONAL CORPORATION, Foothill Ranch, CA (US)

(72) Inventor: Jacob Dykstra, Lake Forest, CA (US)

(73) Assignee: Hampton Products International Corporation, Foothill Ranch, CA (US)

( * ) Notice: Subject to any disclaimer, the term of this patent is extended or adjusted under 35 U.S.C. 154(b) by 0 days.

(21) Appl. No.: 18/483,503

(22) Filed: Oct. 9, 2023

(65) Prior Publication Data

US 2024/0151259 A1 May 9, 2024

Related U.S. Application Data

(60) Provisional application No. 63/423,852, filed on Nov. 9, 2022.

(51) Int. Cl.
*F16B 45/00* (2006.01)
*F16G 11/04* (2006.01)

(52) U.S. Cl.
CPC .................................... *F16B 45/00* (2013.01)

(58) Field of Classification Search
CPC .... F16B 45/00; F16G 11/046; Y10T 24/3918; Y10T 24/39; Y10T 24/3987; Y10T 24/3916; Y10T 24/4755
See application file for complete search history.

(56) References Cited

U.S. PATENT DOCUMENTS

| | | |
|---|---|---|
| 5,351,367 A | 10/1994 | Kennedy et al. |
| 6,049,950 A | 4/2000 | Cavallo |
| 6,401,309 B1 * | 6/2002 | Yang ............... F16G 11/046 24/130 |
| 6,851,163 B2 | 2/2005 | Selby |
| 7,219,398 B1 | 5/2007 | Hunt et al. |
| 7,228,600 B1 | 6/2007 | Selby et al. |
| 8,695,176 B2 | 4/2014 | Gangakhedkar et al. |

(Continued)

OTHER PUBLICATIONS

Amazon, Amtake, Adjustable Flat Bungee Cord, amazon.com/ Adjustable-Bungee-Cord, Amt a ke-Cord-Ta rpauli n/ dp/ B09W2 MCJLL/ref =sr 1 _23?keywords =Adjustable+ Bungee+ Cords&qid = 166680531 1 &qu = ey Jxc2M iOil2ljEwliwicXNhljoi NS42 MCIsl nf zcC16ijUu MzkifQ%3 D%3 D&sr= 8-23 [Retrieved from the Internet on Oct. 26, 2022].

(Continued)

*Primary Examiner* — Jack W Lavinder
(74) *Attorney, Agent, or Firm* — FisherBroyles, LLP; Glen L Nuttall

(57) ABSTRACT

An adjustable-length stretch cord system has a connector and a stretch cord. The position of the connector along the stretch cord can be adjusted so as to adjust the effective length of the stretch cord. The connector has a primary path through which the stretch cord can slide during adjustment. A secondary path is also defined within the connector and parallel to the primary path. A cleat between the primary path and secondary path receives and compresses the cord as the cord turns about 180° in the cleat. The secondary path can have teeth that can engage and block sliding of the cord toward the cleat. The secondary path can also have grip that holds the cord.

19 Claims, 4 Drawing Sheets

(56) References Cited

U.S. PATENT DOCUMENTS

| | | | |
|---|---|---|---|
| 10,660,412 B2* | 5/2020 | Breen | B60P 7/0823 |
| 10,722,015 B1* | 7/2020 | Chu | A45C 13/02 |
| 2004/0060155 A1* | 4/2004 | Selby | F16G 11/143 |
| | | | 24/265 H |
| 2005/0161653 A1* | 7/2005 | Greer | F16G 11/14 |
| | | | 254/262 |
| 2006/0085956 A1 | 4/2006 | Stevens | |
| 2008/0060170 A1 | 3/2008 | Wagner | |
| 2011/0225779 A1 | 9/2011 | Jones | |
| 2012/0311824 A1 | 12/2012 | Mulholland et al. | |
| 2013/0185900 A1 | 7/2013 | Campbell | |
| 2014/0007389 A1 | 1/2014 | Leung | |
| 2015/0232211 A1 | 8/2015 | Garnache et al. | |
| 2018/0298983 A1 | 10/2018 | Dershem | |
| 2019/0032752 A1 | 1/2019 | Romero | |
| 2022/0290736 A1 | 9/2022 | Lozornio | |

OTHER PUBLICATIONS

Amazon, Danik Hook Adjustable Bungee Cord Mini Composite Hook, amazon.com/Danik-Hook-Adjustable-Composite-Adjusts/dp/B08BJF3CNH/ref=sr_1_90?keywords=Adjustable+Bungee+Cords&qid=1666806092&qu=eyJxc2MiOi12LjEwliwicXNhljoiNS42MCIsIn FzcC16ljUu Mz kifQ%3O%3D&sr=8-90 [Retrieved from the Internet on Oct. 26, 2022].

Amazon, Joyeyou Bungee Cords with Adjustable Hooks, amazon.com/JOYEYOU-Bungee-Cords-Adjustable-Canopy/dp/B09G6FR8H8/ref=sr_1_10S_sspa?keywords=Adjustable+Bunge+Cords&qid=1666806469&qu=eyJxc2MiOil2LjEwliwicXNhljoiNS42MCIsInFz cCl6ljUuMzkifQ%3D%3D&sr=8-1 OS-spans&... [Retrieved from the Internet on Oct. 26, 2022].

Amazon, Keeper 06516 Lock-it Adjustable Bungee Cord, amazon.com/Keeper-06516-Lock-Adjustable-Bungee/dp/807 4GZ83 NT/ref=sr_1_124?keywords=Adjustable+Bungee+Cords&qid=1666806537&qu=eyJxc2MiOil2Lj EwliwicXN hljoiNS42MCIslnFzcCl61jUuMzkifQ%30%3D&sr=8-124 [Retrieved from the Internet on Oct. 26, 2022].

Keeper, Zipcord®, Adjustable Bungee, buyhampton.com/collections/keeper-bungees/products/keeper-zipcord-adjustable-bungee [Retrieved from the Internet on Oct. 26, 2022].

Amazon, Marrteum 60 Inch Adjustable Bungee Cord with Hooks Securing Luggage Tent for Daily Home Use Trailers Outdoor Camping Vehicles Roof Racks, amazon.com/MARRTEU M-Adjustable-Securing-Trailers-Vehicles/dp/B09MZ8TVZ6/ref=sr 1_99?keywords=Adjustable+Bungee+Cords&q id=1666806092&qu=ey Jxc2 MiOi 12LjEwliwicXN h ljoi NS42 MClslnFzcCl 6lj UuMzkifQ%3 D%30&sr=8-99 [Retrieved from the Internet on Oct. 26, 2022].

National Hardware, Adjustable Bungee Installation Guide, SN11499 Rev 01, Spectrum Brands, Inc.

Amazon, Secure IT Quick—Adjustable 5/16 Bungee Cords, amazon.com/ Adjustable-16-Bungee-Cords-SIQCN/ dp/B072 M STZ92/ref=sr_1_84 sspa?keywords=Adjustable+Bungee+Cords&qid=1666806092&qu=eyJxc2MiOil2LjEwliwicXNhljoiNS42 MCIsl nf zcC16ljUu MzkifQ%3 D%3 D&sr=8-84-spons&psc=1 [Retrieved from the Internet on Oct. 26, 2022].

* cited by examiner

ADJUSTABLE STRETCH CORD CONNECTOR

CROSS-REFERENCE TO RELATED APPLICATIONS

This application claims the benefit of U.S. Provisional Application No. 63/423,852, filed Nov. 9, 2022, the entirety of which is hereby incorporated by reference.

BACKGROUND

The present disclosure relates to the field of structures using stretch, or bungee, cords, and more specifically to connectors that enable the effective length of the stretch cord to be adjusted.

Stretch cords, also referred to as bungee cords, have been used for years for a wide range of purposes from load tie downs to holding objects together. Although the stretchy nature of bungee cords enables them to be used across a broad variety of sizes, the particular bungee cord being used may not be the right size for a particular application.

Efforts have been made to develop stretch cord systems configured so that the effective length of the bungee cord is adjustable. In some cases, the connector to which the stretch cord is attached can include structure such as a cleat or a toothed cam enabling the cord to be held at various locations, and thus adjusting the effective length of the cord. However, sometimes the cord still is not held securely, and some designs are overly complex and expensive. Also, the free end of the cord can present management challenges, and can sometimes get in the way.

SUMMARY

The present disclosure discloses aspects that improve adjustable-length stretch cord systems. For example, an embodiment discloses a connector having a primary path that allows a stretch cord to extend therethrough and be slidable so that a position of the stretch cord relative to the connector can be selected. A secondary path is also defined within the connector, and a cleat is defined between the primary path and secondary path. The cleat receives and compresses the cord so as to resist sliding of the cord relative to the connector. The cord also turns about 180° in the cleat. The secondary path also can have pairs of teeth that can engage and block sliding of the cord toward the cleat. Further, the secondary path includes a grip that holds the cord. The primary path and secondary path are generally parallel to one another so that the portion of the cord that extends out of the grip is directed generally parallel to the portion of the cord that extends from the primary path.

In accordance with one embodiment, the present specification provides a stretch cord system, comprising an elongated elastic stretch cord and a connector. The stretch cord is configured to elastically deform upon application of force to the stretch cord. The connector comprises an elongated body enclosing an interior space, a primary path disposed within the interior space and communicating with a primary opening formed through a proximal wall of the body, a secondary path disposed within the interior space and communicating with a secondary opening formed through the proximal wall of the body, a divider separating the primary path from the secondary path, the divider extending from the proximal wall to a divider distal end, a cleat comprising a cleat opening and a narrowed portion, the cleat being formed in the divider so that the cleat opening is formed through the divider distal end, a plurality of teeth extending into the secondary path from opposing inner side surfaces of the body, the plurality of teeth disposed distal of the narrowed portion of the cleat, and a grip formed at or adjacent the secondary opening. The grip has a grip path that has a diameter less than a width of the secondary path. The grip also has a grip access space formed through a top wall of the body. The grip access space has a width less than the diameter of the grip body. The stretch cord extends through at least the primary path.

In one variation, an access slot is formed through the top wall, the access slot extending from a proximal end at or adjacent the grip to a distal end so that at least a portion of the secondary path is open via the access slot.

Another variation additionally comprises a redirecting surface aligned with a bottom surface of the primary path. The redirecting surface is arcuate and terminates at the distal end of the access slot. In some such variations, a transition path is defined extending from the primary path to the access slot and between the redirecting surface and the divider distal end.

In yet another variation, each of the teeth comprises an elongated tooth edge, and the tooth edge is elongate in a direction generally transverse to an axis of the secondary path.

In some such variations, each of the teeth extends from the respective inner side surface so as to be inclined proximally relative to the respective inner side surface. In further variations, a space is defined between each tooth edge and the adjacent inner side surface.

DESCRIPTION

Figure 1:
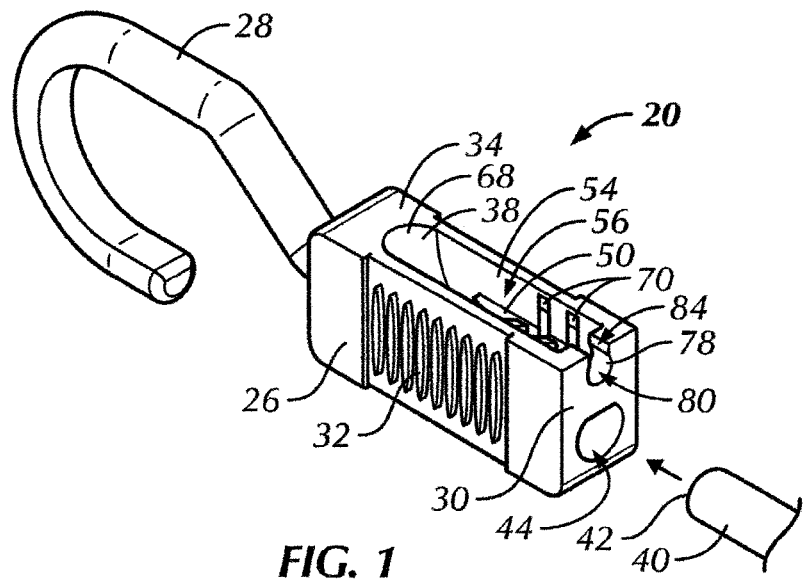
FIG. 1 is a perspective view of an embodiment of a stretch cord connector.
Figure 2:
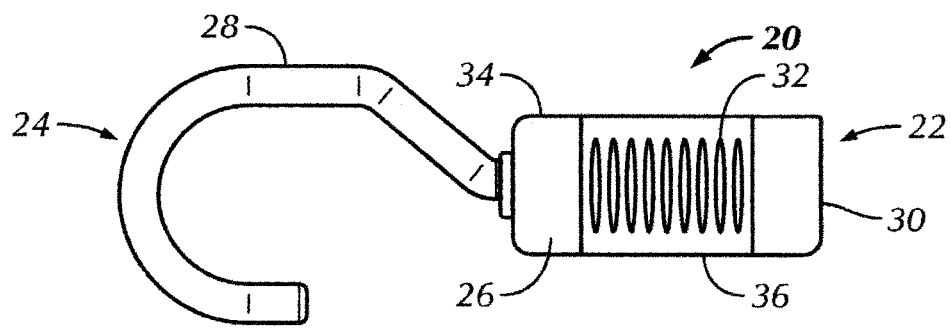
FIG. 2 is a side view of the stretch cord of FIG. 1.
Figure 3:
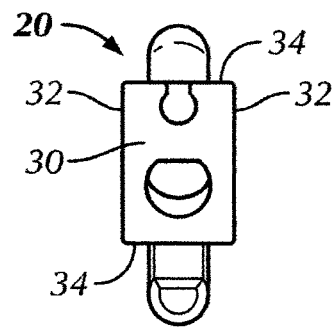
FIG. 3 is a proximal end view of the stretch cord connector of FIG. 1.

With initial reference to FIGS. 1-3, a stretch cord connector 20 is elongated and extends from a proximal end 22 to a distal end 24. A body 26 extends distally from the proximal end 22. A hook 28 extends distally from the body 26, and can define a structure for connecting to external structures. The body 26 can be elongated, extending distally from a proximal wall 30 and defining opposing side walls 32 and a top wall 34 opposite a bottom wall 36. An elongated access slot 38 can be formed through the top wall 34, providing access to the interior of the body 26.

The body 26 is configured to accept and releasably hold an elastic stretch cord 40, often referred to as a bungee cord. A free end 42 of the stretch cord 40 is configured to fit through a primary opening 44 formed through the proximal wall 30. With additional reference to FIGS. 4 and 5, the primary opening 44 opens into a primary path 46 within the body 26. The primary path 46 is defined between a first surface 48 of a divider wall 50, an inner bottom surface 52 and opposing inner side walls 54. The primary path 46 has a primary axis 47. A secondary path 56 is defined parallel to the primary path 46 and adjacent a second surface 58 of the divider wall 50 opposite the primary path 46. The secondary path 56 is defined by the second divider surface 58 and opposing inner side walls 54, but preferably is mostly open via the access slot 38 through the top wall 34. The secondary path 56 has a secondary axis 57.

The divider wall 50 extends distally from the proximal wall 30 to a divider wall distal end 59. A cleat 60 is formed through the divider 50 by a pair of opposing cleat surfaces 62 that extend proximally from the divider wall distal end 59 to a cleat proximal base 64. A cleat opening 66 is defined between the cleat surfaces 62 at the distal end 59 of the divider wall 50. The cleat surfaces 62 are angled adjacent the cleat opening 66 so as to come closer together moving proximally from the distal end 59 to a narrowed portion in which the cleat surfaces 62 are closest together, which narrowed portion preferably is adjacent the proximal base 64. Preferably, in the narrowed portion, the cleat surfaces 62 are substantially parallel to one another. Eventually, the cleat surfaces 62 turn so as to meet each other at the cleat proximal base 64. The cleat 60 can be considered a holding structure configured to hold the stretch cord 40 when it is extending through the cleat 60.

Figure 5:
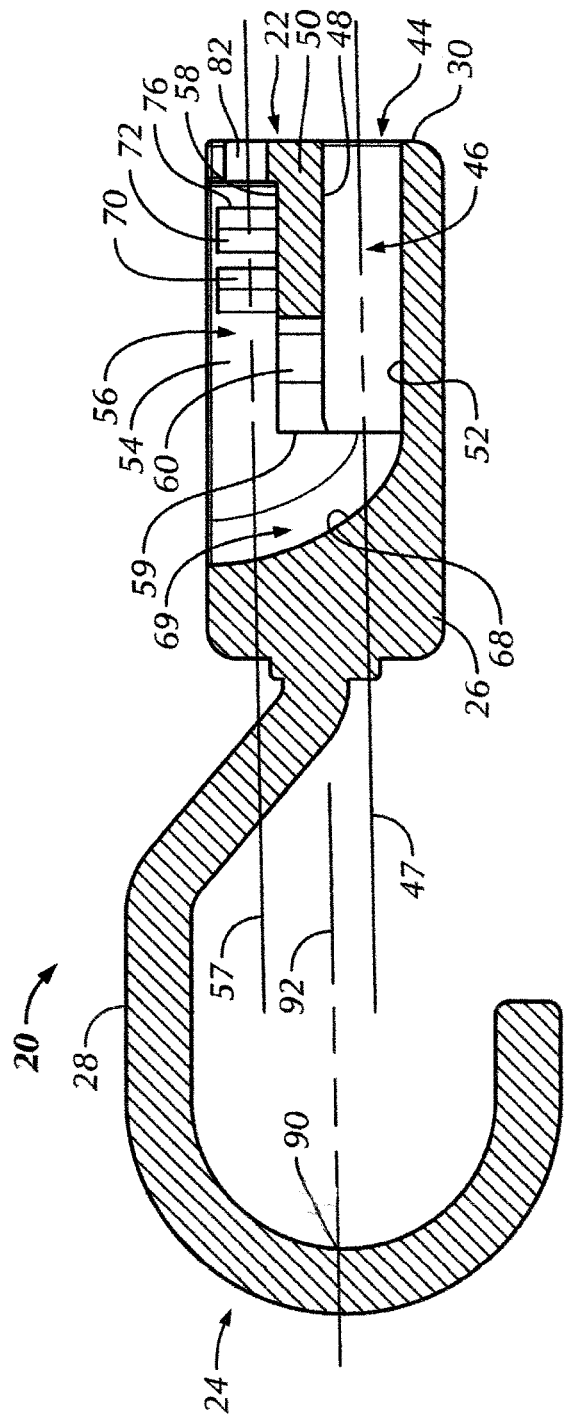
FIG. 5 is a cross-sectional view taken along line 5-5 of FIG. 4.

As best shown in FIG. 5, a curving redirecting surface 68 aligns with the inner bottom surface 52 and then curves toward and through the access slot 38, preferably defining the distal end of the access slot 38. In this manner, the inner bottom surface 52 and curving redirecting surface 68 together define a contiguous, unbroken surface. A transition path 69 is defined adjacent the redirecting surface 66 and aligning with the primary path 46. However, the transition path 69 curves toward and through the top wall 34, terminating in a direction that is transverse to the primary path 46. As such, the transition path 69 extends transversely past (and distal to) the cleat opening 64 and the secondary path 56.

Figure 4:
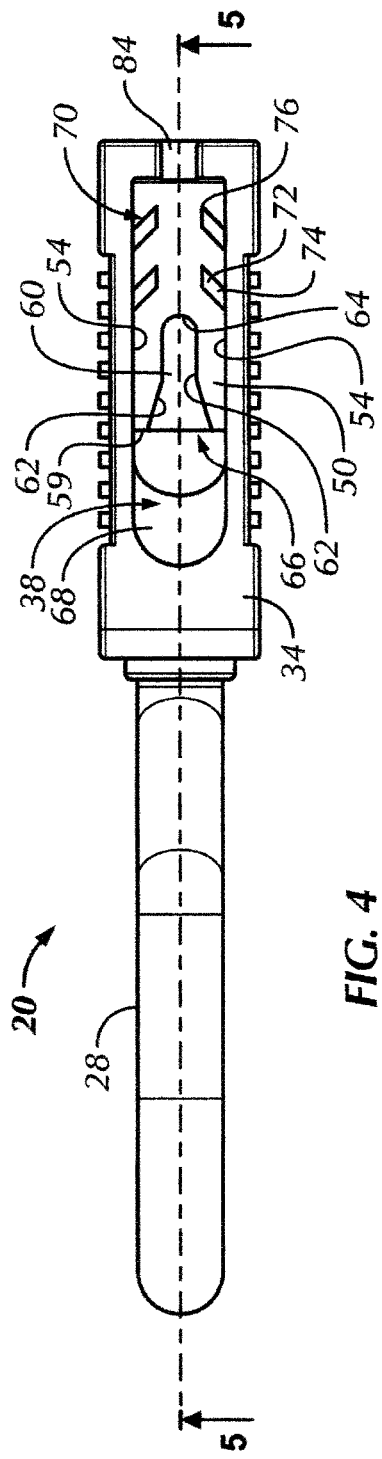
FIG. 4 is a top view of the stretch cord connector of FIG. 1.

Continuing with reference to FIGS. 4 and 5, a plurality of teeth 70 extend from the inner side walls 54 into the secondary path 56. Each of the teeth 70 comprises a tooth body 72 that attaches to the inner side wall 54 at a base 74 and terminates at a tooth edge 76. The tooth edges 76 are elongated and directed normal to the second divider surface 58. The tooth bodies 72 are inclined in a proximal direction relative to the inner side walls 54 so that there is a space between each tooth edge 76 and the adjacent inner side wall 54. Preferably the tooth bodies are inclined between about 30° and 60°, and more preferably about 45°. As shown, bases 74 of the distal-most teeth 70 are attached to the inner side walls 54 at locations proximal of the cleat base 64, and thus the edges 76 are proximal of the base 64. The teeth 70 can be also be considered a holding structure configured to hold the stretch cord 40 when it is extending through the secondary path 56.

A secondary aperture 78 is formed through the proximal wall 30 along the secondary axis 57 and communicating with the secondary path 56. A proximal grip 80 is defined at the secondary aperture 78. The proximal grip 80 defines a grip path 82 that has a diameter substantially less than a diameter of the primary path 46, such as between about 40-75% of the diameter of the primary path 46. A grip access space 84 is defined through the top wall 34 at the grip 80 and defines a width less than the diameter of the grip path 82. The proximal grip 80 can also be considered a holding structure configured to hold the stretch cord when it is extending through the proximal grip 80.

Figure 6:
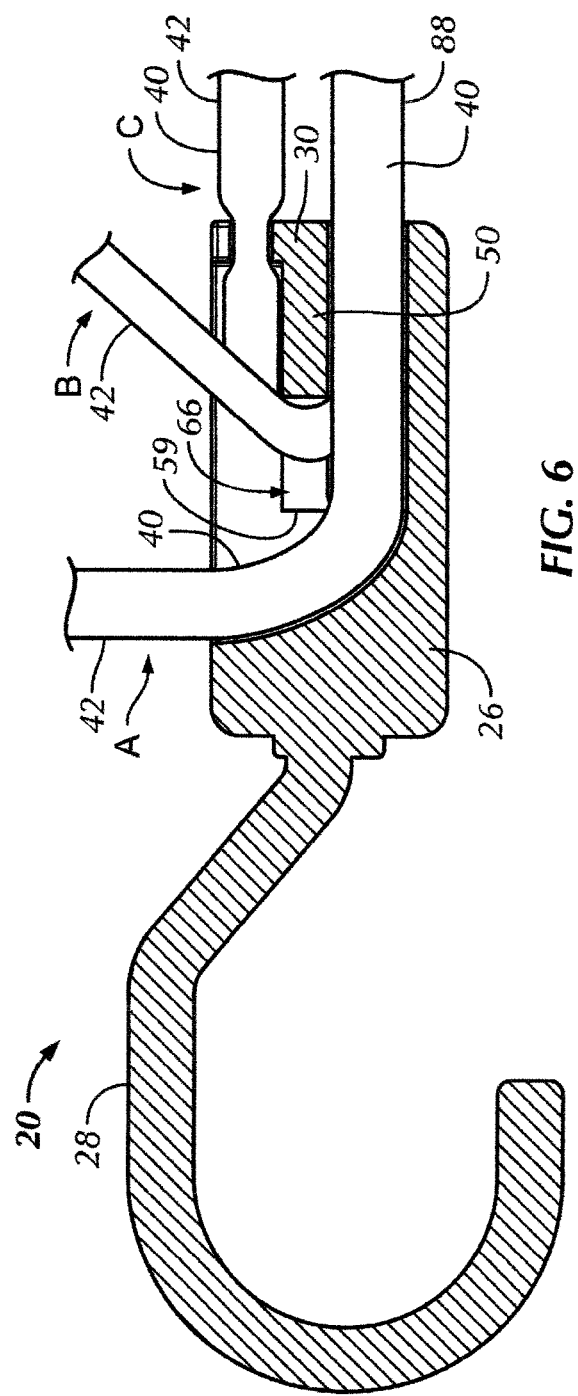
FIG. 6 shows the arrangement of FIG. 5 with a stretch cord connected thereto and depicted in positions A, B and C.
Figure 7:
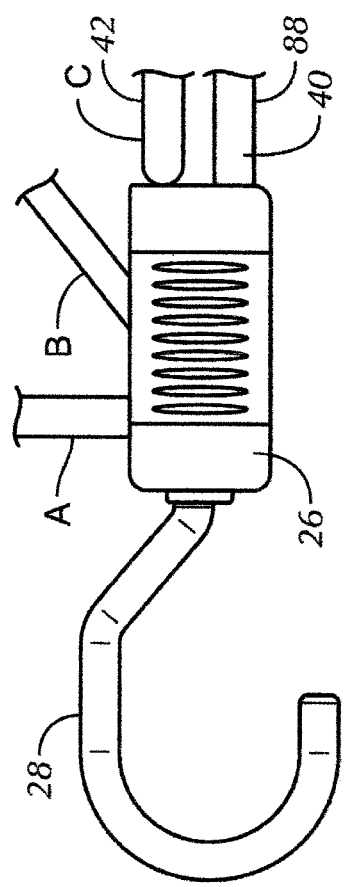
FIG. 7 shows a stretch cord system comprising the stretch cord connector of FIG. 2 with a stretch cord connected thereto and depicted in positions A, B and C.

In use, the free end 42 of the stretch cord 40 can be advanced distally through the primary opening 44 into and through the primary path 46. As the cord 40 continues to be advanced distally, and as depicted in FIGS. 6 and 7, the cord is deflected by the redirecting surface 68 along the transition path 69 and out of the access slot 38 so that the free end 42 of the cord 40 extends transversely to the primary path 46, as shown by configuration A in FIGS. 6 and 7. Preferably, the primary opening 44, primary path 46, and transition path 69 each have a diameter approximating, and preferably the same or greater than, an at-rest diameter of the stretch cord 40. As such, the stretch cord 40 readily slides along the primary path 46 and transition path 69 while the stretch cord 40 is and remains in an at-rest or relaxed—which is to say substantially unstretched—condition.

Once in place in configuration A, which can be considered an adjustment configuration, the stretch cord 40 can be pulled through the connector 20 so that the effective length of the cord 40 is as desired by the user. Since the stretch cord 40 readily slides along the primary path 40 and transition path 69, such adjustment of the effective length of the cord 40 can be achieved with minimal resistance. The free end 42 can hang outside the access slot 38. In some variations the free end 42 can be tied, folded, clamped or the like so that it cannot be pulled proximally back through the access slot 38 and/or primary path 46, thus blocking the cord 40 from being pulled all the way out of the connector 20. In some variations, the primary path 46 and/or transition path 69 can have a diameter slightly less than the at-rest diameter of the stretch cord 40 so that there is some minor resistance to the stretch cord 40 being pulled through the connector 20 to adjust the effective length of the stretch cord 40. This minor resistance is not sufficient to hold a load, but preferably is just sufficient so that when the connector is placed at the desired position a light frictional force between the stretch cord 40 and the inside of the connector 20 holds the connector 20 in its selected position absent application of an external load to the connector 20.

Figure 9:
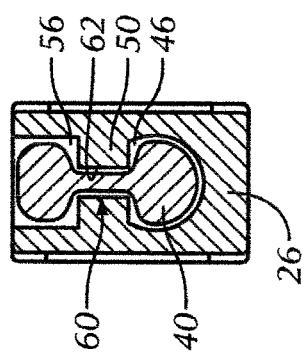
FIG. 9 is a cross-sectional view taken along line 9-9 of FIG. 8.

Continuing with reference to FIGS. 6 and 7, once the stretch cord 40 has been positioned in the desired location relative to the connector 20, the user can pull the free end 42 proximally through the access slot 38 to configuration B, so that the cord 40 is pulled through the cleat opening 64 into the narrowed portion of the cleat 60. Since the distance between the cleat surfaces 62 in the cleat 60 is much less than the at-rest diameter of the stretch cord 40, the cord is compressed and deflected within the cleat 60, as depicted in FIG. 9. Also, since the opposing cleat surfaces 62 in the narrowed portion are not inclined toward the cleat opening 60, the compressed portion of the stretch cord 40 held therebetween is retained in place, and elastic resistance within the compressed portion of the stretch cord 40 will not urge the stretch cord 40 distally out of the cleat 60.

After the cord 40 is engaged within the cleat 60 the user can continue to pull the free end 42 proximally to force the cord 40 through the grip access space 84 into the grip 80, and simultaneously the cord 40 will be pulled into the secondary path 56 and into engagement with the teeth 70. This is best accomplished by stretching the stretch cord 40 so as to reduce its diameter so that it will fit through the grip access space 84 and between the opposing teeth edges 76. Once in place, the free end 42 can be released. The stretch cord 40 will attempt to return to the relaxed configuration, but will be compressed between the teeth edges 76 and within the proximal grip 80. This arrangement is depicted as configuration C in FIGS. 6 and 7, and also depicted in FIGS. 8 and 9. As shown, the cord 40 turns about 180° at the cleat 60 in addition to being compressed. The cord can be at rest or partially at rest on either side of the cleat 60. This in addition to the 180° turn creates a large friction load resisting movement of the cord sliding through the cleat 60 and secondary path 56.

Figure 8:
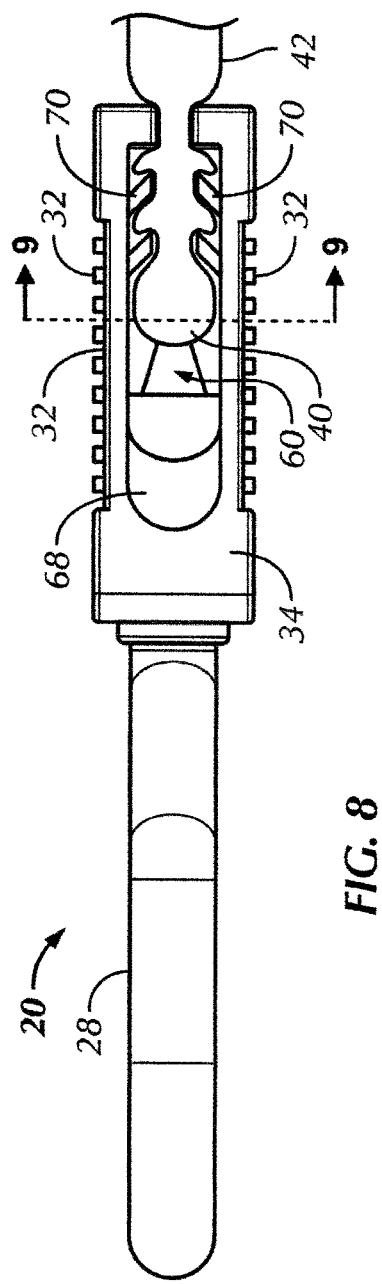
FIG. 8 shows a top view of the stretch cord system of FIG. 7 with the stretch cord in position C.

As shown, in addition to compression in the narrowed portion of the cleat 60, the cord 40 is also compressed at the teeth 70 and at the grip 80. Each of these holding structures resists sliding movement of the cord 40. Further, as the teeth 70 are inclined proximally, they will tend to allow the cord 40 to move proximally within the secondary path 56, but provide extra resistance to movement of the cord 40 distally within the secondary path 56. The space between opposing tooth edges 76 is substantially less than the at-rest diameter of the cord 40. As such, and as depicted in FIG. 8, portions of the cord are compressed between opposing teeth 70, but can be at least partially relaxed proximal of such teeth 70. The tooth edges 76 thus will tend to engage the cord 40 so as to prevent distal sliding movement of the cord 40. Also, since the cord is compressed within the grip 80, movement of the cord 40 proximally or distally is resisted. Movement of the cord out of the grip 80 through the grip access space 84 is also resisted, thus directing the free end 42 in a direction generally parallel to the portion of the cord 40 adjacent the primary opening 44.

In this configuration C, which can be considered a secured configuration, the cord 40 is ready for use carrying a load. An effective portion 88 of the stretch cord 40 is that portion extending proximally from the primary opening 44. Preferably, the free end 42 is directed substantially parallel to the effective portion 88. The effective portion 88 can be connected to a second connector (not shown), and an effective length of the stretch cord 40 is from the connector 20 to the second connector. The second connector can be identical to the illustrated connector 20, or can be a connector that is not configured to allow adjustment of the position of the stretch cord relative to the connector. The connector 20, stretch cord 40 and second connector can collectively comprise a stretch cord system.

The stretch cord system can be placed in use by attaching the second connector and connector 20 to structures so a load is applied to the stretch cord 40 and the stretch cord 40 deforms elastically to bear such load. A force is thus applied along the stretch cord 40 tending to pull the stretch cord 40 proximally within the primary path 46, and thus tending to pull the cord 40 slidingly through the cleat 60. The cleat 60, of course, and as discussed above, is a holding structure that will resist such sliding motion. However, to the extent the cleat 60 allows any such sliding, the cord 40 within the secondary path 56 will be urged distally into greater engagement with the teeth edges 76, which edges 76 will bite into the cord 40 so as to further resist sliding in the distal direction. The grip 80 will also resist sliding of the cord 40 distally (or proximally). These multiple holding structures provide enhanced resistance to the stretch cord 40 slipping when under load.

With reference again to FIG. 5, the illustrated connector 20 comprises the hook 28, which is curved. An apex 90 of the curved hook 28 can be defined where a tangent line of the hook is normal to the primary axis 47. An apex axis 92 can be defined parallel to the primary axis 47 and intersecting the hook apex 90. In the illustrated embodiment the apex axis 92 is disposed between the primary axis 47 and the secondary axis 57. This enables the connector 20 to be generally aligned with the load as applied by the stretch cord 40 at the body 26. More preferably, the apex axis 92 is disposed between the primary axis 47 and the first divider surface 48.

In the illustrated embodiments, the stretch cord 40 comprises a typical bungee cord having a generally circular cross-section. It is to be anticipated that principles and aspects as discussed above can be employed with cords having other cross-sectional shapes, such as oval. Also, the illustrated primary opening 44 and primary path 46 are generally circular in shape except that the first divider surface 48 is flat, so that a portion of the primary path 46 and primary opening 44 is flat. The flat first divider surface 48 can provide some benefit with regard to transition to the cleat 60. The illustrated second divider surface 58 is also flat, as are the inner side walls 54 in the secondary path 56.

In the illustrated embodiment the connector 20 comprises a unitary structure made of a plastic. The hook 28 and the body 26 can be molded together as one monolithic piece, or can be constructed of multiple molded pieces welded or otherwise bonded together. Further, portions of the connector 20, such as the hook 28, can be formed of a different material, such as a metal.

The embodiments discussed above have disclosed structures with substantial specificity. This has provided a good context for disclosing and discussing inventive subject matter. However, it is to be understood that other embodiments may employ different specific structural shapes and interactions. For example, the hook 28 has been depicted as having a traditional hook-type shape. However, it is to be understood that any structure for connecting to another structure can be considered a hook. For example, in some embodiments a structure resembling a carabiner can be employed instead of the illustrated hook. In such embodiments, the carabiner, or at least a portion thereof, can be considered to be a "hook" of the connector. In fact, any type of connecting structure can be considered to be a "hook" of the connector in the context of this specification.

In the illustrated embodiment, holding structures are depicted on the secondary path 56 and between the primary path 46 and secondary path 56, but no holding structures are positioned within the primary path 46 or the transition path 69.

The terms "top", "bottom", "side", "proximal" and "distal" have been used in this specification to aid discussion of relative positioning of certain structures. These terms have been used in the context of the paper drawings. It is to be understood that the illustrated connector can be oriented in many positions, and in some configurations what has been referred to herein as the top wall 34 may be disposed below the bottom wall 36. In such cases the reader is reminded that these appellations are intended to show relative position based on the depiction in the drawings, not a limitation of how the illustrated structure and inventive aspects need be applied in additional embodiments.

Although inventive subject matter has been disclosed in the context of certain preferred or illustrated embodiments and examples, it will be understood by those skilled in the art that the inventive subject matter extends beyond the specifically disclosed embodiments to other alternative embodiments and/or uses of the invention and obvious modifications and equivalents thereof. In addition, while a number of variations of the disclosed embodiments have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. Accordingly, it should be understood that various features and aspects of the disclosed embodiments can be combined with or substituted for one another in order to form varying modes of the disclosed inventive subject matter. Thus, it is intended that the scope of the inventive subject matter claimed herein should not be limited by the particular disclosed embodiments described above.

What is claimed is:

1. A stretch cord system, comprising:
   an elongated elastic stretch cord configured to elastically deform upon application of force to the elongated elastic stretch cord; and
   a connector, comprising:
   an elongated body enclosing an interior space;
   a primary path disposed within the interior space and communicating with a primary opening formed through a proximal wall of the elongated body;
   a secondary path disposed within the interior space and communicating with a secondary opening formed through the proximal wall of the elongated body;
   a divider separating the primary path from the secondary path, the divider extending from the proximal wall of the elongated body to a divider distal end;
   a cleat comprising a cleat opening and a narrowed portion, the cleat being formed in the divider so that the cleat opening is formed through the divider distal end;
   a plurality of teeth extending into the secondary path from opposing first and second inner side surfaces of the elongated body, the plurality of teeth disposed distal of the narrowed portion of the cleat; and
   a grip formed at or adjacent the secondary opening, the grip having a grip path that has a diameter less than a width of the secondary path, the grip also having a grip access space formed through a top wall of the elongated body, the grip access space having a width less than the diameter of the grip path
   wherein the elongated elastic stretch cord extends through at least the primary path.

2. The stretch cord system of claim 1, wherein an access slot is formed through the top wall, the access slot extending from a proximal end at or adjacent the grip to a distal end so that at least a portion of the secondary path is open via the access slot.

3. The stretch cord system of claim 2, additionally comprising a redirecting surface aligned with a bottom surface of the primary path, the redirecting surface being arcuate and terminating at the distal end of the access slot.

4. The stretch cord system of claim 2, wherein a transition path is defined extending from the primary path to the access slot and between the redirecting surface and the divider distal end.

5. The stretch cord system of claim 2, wherein each of the plurality of teeth comprises an elongated tooth edge, and the elongated tooth edge is elongate in a direction generally transverse to an axis of the secondary path.

6. The stretch cord system of claim 5, wherein each of the plurality of teeth extends from the adjacent inner side surface so as to be inclined proximally relative to the adjacent inner side surface.

7. The stretch cord system of claim 6, wherein a space is defined between each elongated tooth edge and the adjacent inner side surface.

8. The stretch cord system of claim 6, wherein each of the plurality of teeth is inclined between about 30-60° relative to the adjacent inner side surface.

9. The stretch cord system of claim 2, wherein the divider comprises a divider primary surface facing the primary path, and wherein the divider primary surface is substantially flat.

10. The stretch cord system of claim 9, wherein a surface of the primary path opposite the divider primary surface is arcuate in cross-section.

11. The stretch cord system of claim 2, wherein the connector is a unitary structure.

12. The stretch cord system of claim 2, comprising the primary opening communicating with the primary path, wherein the primary opening has a primary diameter and the elongated elastic stretch cord has an at-rest diameter, and wherein the primary diameter is less than the at-rest diameter.

13. The stretch cord system of claim 12, wherein the diameter of the grip path is about 40-75% of the the diameter of the primary path.

14. The stretch cord system of claim 1, wherein the cleat comprises opposing cleat surfaces that converge toward one another between the cleat opening and the narrowed portion and do not converge toward one another in the narrowed portion, and the cleat terminates at a cleat base opposite the cleat opening.

15. The stretch cord system of claim 14, wherein the plurality of teeth are disposed proximal of the cleat base.

16. The stretch cord system of claim 1, wherein the primary path has a primary axis and the secondary path has a secondary axis, and wherein the primary axis is parallel to the secondary axis.

17. The stretch cord system of claim 16 additionally comprising a curved hook portion having an apex at which a tangent line of the curved hook portion is normal to the primary axis, an apex axis defined parallel to the primary axis and intersecting the apex, and wherein the apex axis is between the primary axis and the secondary axis.

18. The stretch cord system of claim 17, wherein the apex axis is between the primary axis and the divider.

19. The stretch cord system of claim 17, wherein the connector is a unitary structure and the connector and the curved hook portion are molded together as one monolithic piece.

* * * * *